(12) United States Patent
Stevenson et al.

(10) Patent No.: US 12,204,047 B2
(45) Date of Patent: Jan. 21, 2025

(54) METHOD AND SYSTEM FOR DETECTING THE TUMBLING CHARACTERISTICS OF SPACE OBJECTS

(71) Applicant: LeoLabs, Inc., Menlo Park, CA (US)

(72) Inventors: Matthew Stevenson, San Jose, CA (US); Michael James Nicolls, Portola Valley, CA (US)

(73) Assignee: LeoLabs, Inc., Menlo Park, CA (US)

( * ) Notice: Subject to any disclaimer, the term of this patent is extended or adjusted under 35 U.S.C. 154(b) by 756 days.

(21) Appl. No.: 17/410,776

(22) Filed: Aug. 24, 2021

(65) Prior Publication Data

US 2022/0065990 A1 Mar. 3, 2022

Related U.S. Application Data

(60) Provisional application No. 63/069,828, filed on Aug. 25, 2020.

(51) Int. Cl.
*G01S 7/41* (2006.01)
*G01S 13/88* (2006.01)

(52) U.S. Cl.
CPC ............... *G01S 7/41* (2013.01); *G01S 13/88* (2013.01)

(58) Field of Classification Search
CPC . G01S 13/88; G01S 7/41; G01S 7/415; G01S 13/534
See application file for complete search history.

(56) References Cited

U.S. PATENT DOCUMENTS

| 11,822,007 | B2* | 11/2023 | Novoselsky | G01S 7/417 |
| 2016/0238695 | A1* | 8/2016 | Theurer | G01S 13/958 |
| 2020/0333533 | A1* | 10/2020 | Rogers | G01S 17/89 |

FOREIGN PATENT DOCUMENTS

CN 108287334 7/2018

OTHER PUBLICATIONS

Cai Wang et al., "Space object identification based on narrowband radar cross section," Imae and Signal Processing (CISP), 2012 5th International Congress on, IEEE, Oct. 16, 2012, pp. 1653-1657.
Matthew A. Stevenson Leolabs et al., "Space object attitude stability determined from radar cross-section statistics," Aug. 30, 2019, XP055741931.

* cited by examiner

*Primary Examiner* — Margaret G Mastrodonato
(74) *Attorney, Agent, or Firm* — Dentons US LLP

(57) ABSTRACT

A method of determining tumbling characteristics of resident space objects includes acquiring a geometry of a target object, generating a distribution of radio scatterers within the geometry of the target, calculating multiple radar cross sections at different angles for the distribution, finding an autocorrelation for each radar cross section versus each angle, using the autocorrelations to find a decorrelation angle, extracting a decorrelation time from radar data of the object, and finding a rotation rate of the object as the tumbling characteristic.

28 Claims, 15 Drawing Sheets

METHOD AND SYSTEM FOR DETECTING THE TUMBLING CHARACTERISTICS OF SPACE OBJECTS

This application is a priority to U.S. Provisional Application No. 63/069,828 filed Aug. 25, 2020, the contents of which is hereby incorporated by reference herein in its entirety.

The present application relates to a method and system for detecting the tumbling characteristics of space objects, and in particular of artificial satellites.

BACKGROUND

In the field of space situational awareness, it is desirable to be able to characterize the tumbling characteristics of resident space objects (RSOs) remotely and without requiring the cooperation of the RSOs themselves. This has relevance for a number of applications, including but not limited to; alerting satellite operators if their satellites begin to tumble, characterizing objects that are stabilized, which may indicate that they are actively controlled satellites, and understanding the characteristics of space debris and other uncooperative objects.

Currently available approaches include optical "light curve" measurements, showing the change in brightness of an object as a function of time. Other approaches include using radiometric data showing the scattered or radiated signal strength of an object as a function of time. However, both of these approaches rely on some knowledge or data about the object being available. Further, such approaches require observing and making measurements of an object over a prolonged period, typically at least one full revolution, so that periodic changes in brightness or signal strength can be identified.

Accordingly, it is desirable to provide an improved means for characterizing the tumbling characteristics of space objects.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first aspect, the present disclosure provides a method of determining at least one tumbling characteristic of an object, comprising: obtaining an expected radar cross section (RCS) decorrelation angle of an object; obtaining radar data of the object; determining a decorrelation time of the RCS of the object from the radar data of the object; and using the obtained decorrelation angle and the determined decorrelation time to determine at least one tumbling characteristic of the object.

In a second aspect, the present disclosure provides a system arranged to carry out the method of the first aspect.

In a third aspect, the present disclosure provides a system to determine tumbling characteristic of objects, comprising: a radar to obtain radar data of each object; and at least one processor arranged to execute code to allow the processor to: obtain a decorrelation angle of a radar cross section (RCS) of each object; determine a decorrelation time of the RCS of each object from the radar data of that object; and use the obtained decorrelation angle and the determined decorrelation time for each object to determine the at least one tumbling characteristic of that object, The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
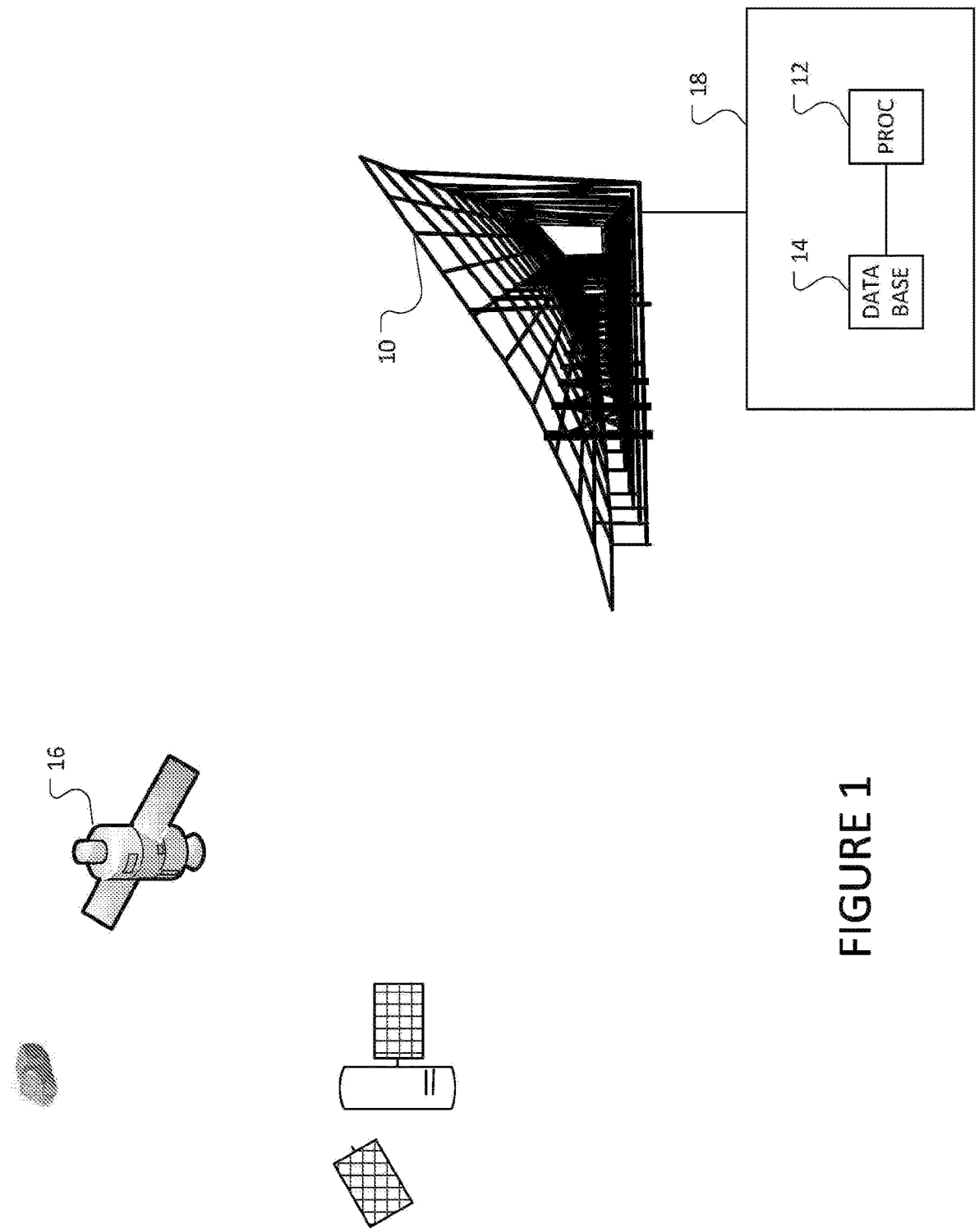
FIG. 1 is an explanatory diagram of a radar system used to track resident space objects according to a first embodiment.

Common reference numerals are used throughout the Figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a system 1 used to gather information regarding resident space objects (RSOs). The system comprises a radar array 10 residing at a fixed position on the Earth and sends signals towards RSOs, such as RSO 16, receives return signals reflected from the RSOs, and a signal analyzing system 18 which determines data about the RSOs from the return signals. The RSOs may, for example, be debris, such as fragmentation debris, or operating satellites. In FIG. 1 the RSO 16 is an operating satellite. As the RSOs travel across the sky, the radar array 10 gathers data about them.

The data gathered by the radar array 10 may be used for other purposes in addition to characterizing the tumbling characteristics of the RSOs. In the illustrated example the data gathered by the radar array 10 is also used by a system tracking RSOs and determining their orbital paths. However, this is not essential. In some instances, the system 1 may be directed in the data gathering, for example by a party such as a satellite operator interested in 'finding' their satellites and determining if they are tumbling, or just by a general program of characterizing all RSOs, or all RSOs having particular properties. In the embodiments described herein, the radar array 10 gathers data from RSOs, such as RSO 16, typically in low Earth orbit. Low Earth orbit is typically defined at an altitude between 160 to 2,000 kilometers (99 to 1200 miles) above the Earth's surface. In other examples the radar array 10 may alternatively, or additionally, gather data from RSOs in other orbits.

In the embodiments herein, the data collected by the radar array 10 allows identification of a tumbling characteristic of the objects. In most of the embodiments herein, the identified tumbling characteristic takes the form of the rotation rate of the object, but other characteristics are possible.

In the illustrated embodiment of FIG. 1, the identification of the rotation rate of the RSO 16 will be performed by a one or more processors 12 of the signal analyzing system 18. In FIG. 1 the signal analyzing system 18 is shown external from the radar system 10. However, in other examples the processor 12 may comprise a processor that resides at the radar system 10, one or more processors that reside at the radar elements themselves. The processor or processors 12 will execute code that will allow them to identify the tumbling characteristics of space objects, such as RSO 16. The signal analyzing system 18 may also comprise a database 14. The database 14 may store the various rotational profiles used to determine a rotation of a target, and/or the identification of an object, possibly by its geometry, and its resulting tumbling characteristic. Similarly to the processor 12, the database 14, if one is used, may alternatively reside at the radar system 10, or may be an external database. In some examples the signal analyzing system 18 may reside in a radar control module of the radar system 10. In embodiments the processes of FIGS. 2, 3 and 14 may be carried out by the processor 12 executing suitable code.

Figure 2:
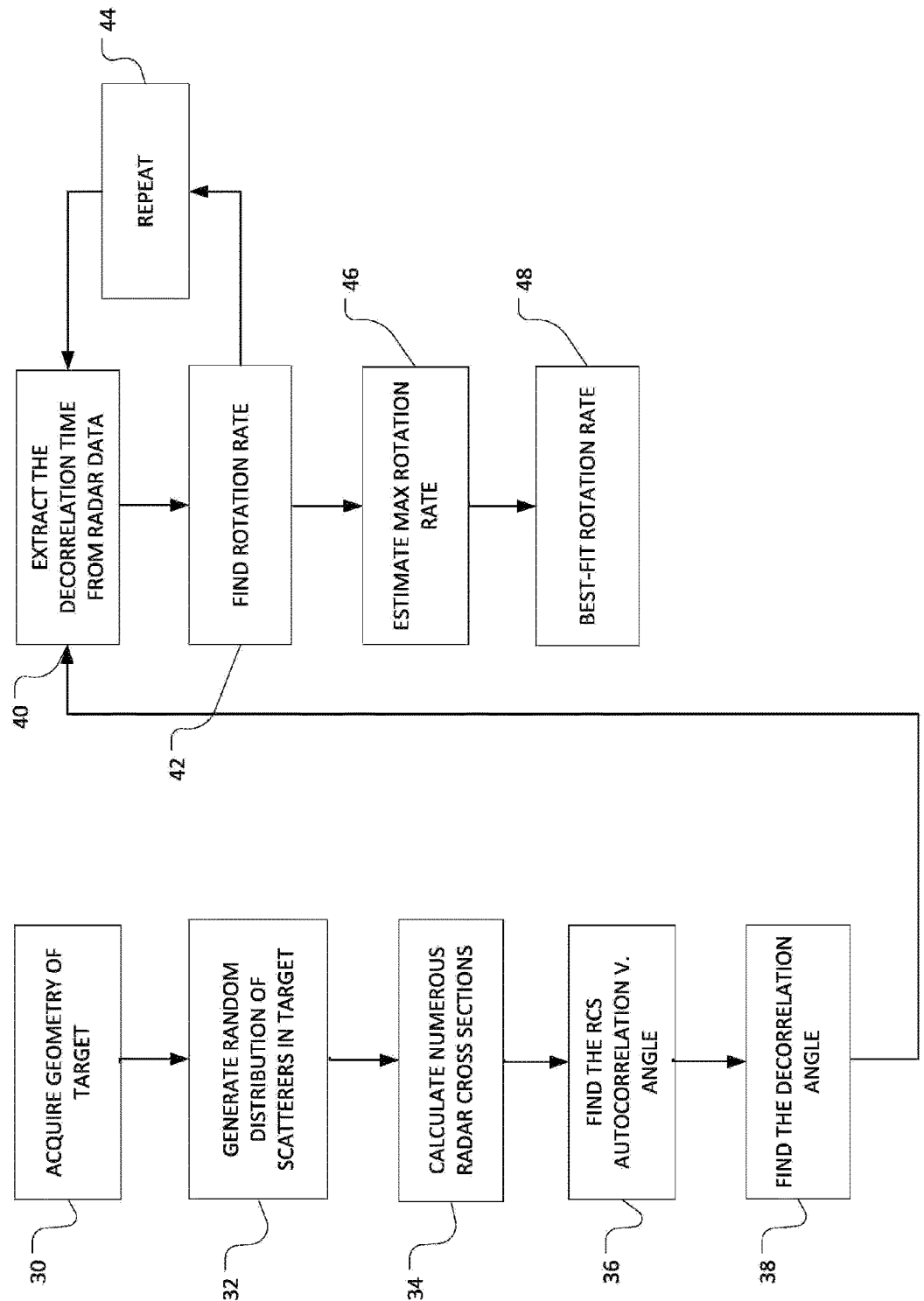
FIG. 2 is a flowchart of an embodiment of a method to determine the rotation rate of resident space objects according to the first embodiment.

FIG. 2 shows a flowchart of an embodiment of an overall process to determine tumbling characteristics of resident space objects (RSOs), also referred to herein as objects. In the illustrated embodiment of FIG. 1, the radar array 10 tracks most, if not all, objects in low earth orbit. The gathered radar data regarding each of the objects is then analyzed, and objects undergoing the analysis will be referred to as targets. The process illustrated in FIG. 2 determines a tumbling characteristic of a single target object 16. It will be understood that the process of FIG. 2 may be separately carried out for a number of different target objects sequentially or simultaneously by the signal analyzing system 18.

The process begins by selecting a target object to analyze in the gathered radar data, and obtaining or acquiring the geometry of the target object 16 in a block 30. In the illustrated example the process determines the geometry of the target 16, by estimation based upon the radar data collected by the radar array 10 regarding the target 16, commonly referred to as the radar signature of the target 16. As used herein, the geometry of the target 16 comprises at least one physical dimension of the target 16, for example one-, two-, or three-dimensional extents of the target 16, or a detailed three-dimensional shape of the target 16.

In other examples the geometry of the target object may be obtained in other ways. In some examples further sensors may be used to determine the geometry of the target object in addition to the radar array 10. In some examples where the identity of the target object can be confirmed it may be possible to obtain stored information regarding the geometry of the target object. For example, a satellite operator may provide details of their satellites of interest including the ephemerides and details of the geometries of the satellites so that the system can identify the satellites of interest in the radar data and determine their tumbling characteristics.

Figure 4:
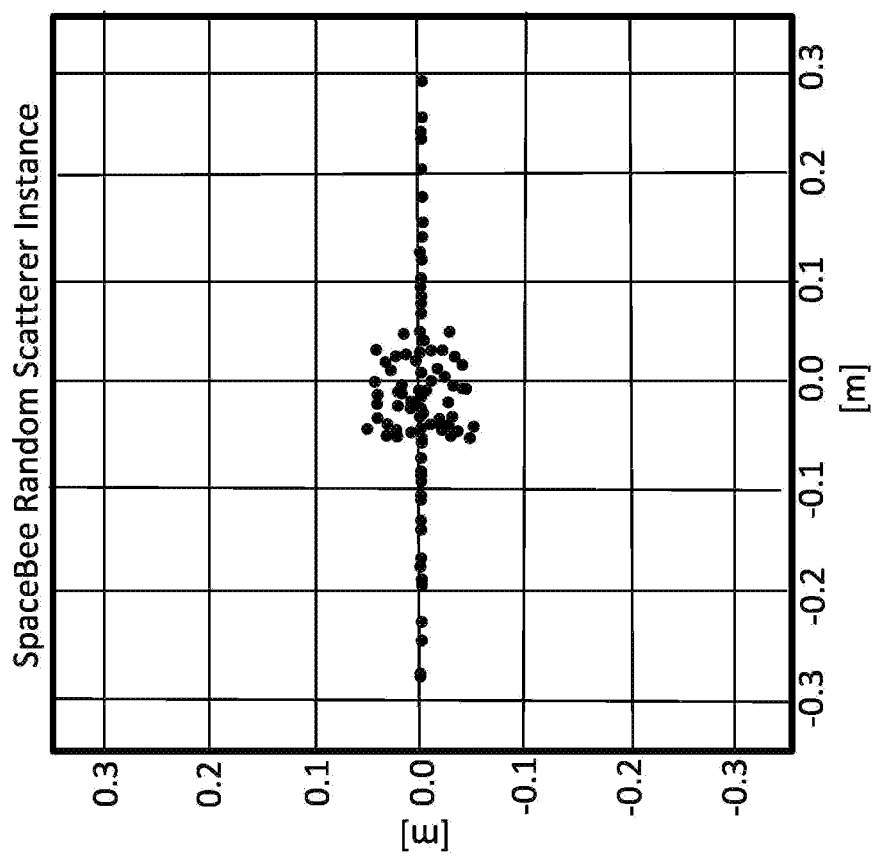
FIG. 4 is an explanatory diagram showing an example of a random scatterer model of a satellite.

At block 32, the process generates a model of the radar reflection properties of the target object by synthesizing a random distribution of radio scatterers within the volume of the target based upon the acquired geometry of the target. An example of a generated radar reflection model is shown in FIG. 4, where 100 radio scatterers are randomly distributed through the acquired geometry of a target object. A different number of radar scatterers may be used in other examples.

Then, at block 34, the process calculates numerous radar cross sections (RCS) using a physical modeling process from at least one generated model instance, and generally from an ensemble of a plurality of generated model instances, in order to average over model uncertainty. It will be understood that the actual numbers and locations of radio/radar scattering points, such as edges, corners, imperfections, screw heads, and the like, generally cannot be accurately determined remotely, and accordingly an ensemble of plural different generated model instances with different random distributions of radio scatterers are used to collectively provide a better approximation to the real target object. In examples where detailed information on the scattering geometry of the target object is known known, for example where the target object is known to be a particular satellite, this information could be incorporated into the scattering model.

Then, at block 36, a number of RCS autocorrelations as a function of angle are determined for each of the generated model instances by rotating each model with respect to the hypothetical radar observer and calculating the RCS of the model at different angles. It will be understood that if the model is rotated beyond the autocorrelation angle the RCS appears effectively random. The calculated RCS at different angles for each model is then used to calculate the RCS autocorrelation function for each model. The RCS angle autocorrelation functions are calculated for a number of different parameter values for each model. The different angles may, for example, include different axes of rotation of the model and different angular positions about these axes.

Other parameters may also be used. The resulting group of angle autocorrelation functions is referred to here as an ensemble of functions, and this ensemble of functions can be used to interpret a measured RCS signature, as will be discussed in more detail below.

Figure 5:
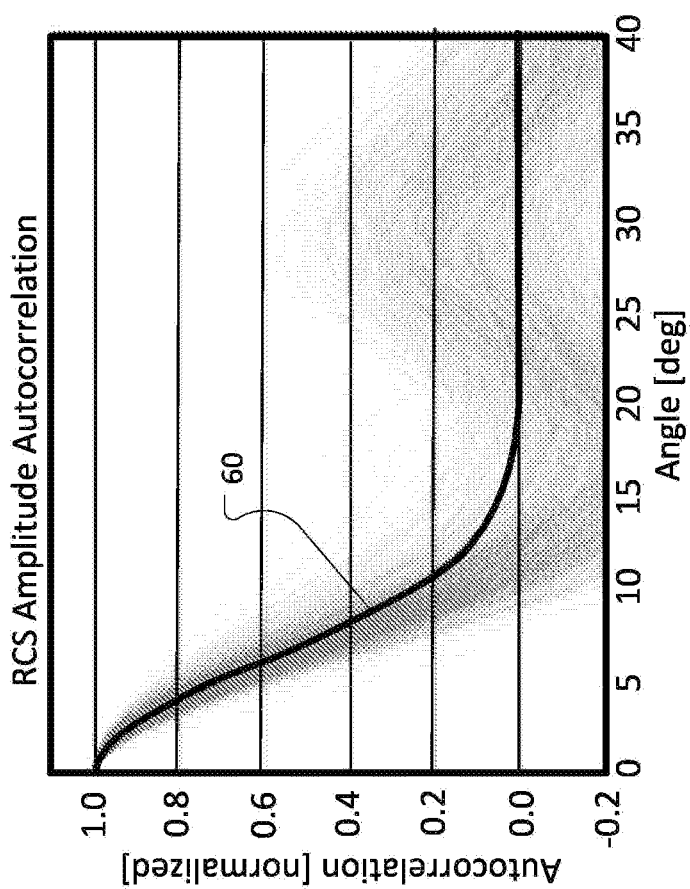
FIG. 5 shows a graph of autocorrelation versus angle for a resident space object for an ensemble of models.

In block 36 the ensemble of RCS angle autocorrelation functions is analyzed to determine a best fit curve to the ensemble. The best fit curve may be an averaged curve. However, other types of best fit curve may be used. The determined best fit curve is used as an estimated angle autocorrelation function for the modeled geometry of the target object. FIG. 5 shows a graphical representation of a normalized set of angle autocorrelation curves corresponding to an example group or ensemble of calculated angle autocorrelation functions for a target object, and the curve 60 is a best fit to the set of curves. The best fit curve is an estimate of the expected angle autocorrelation function given the modeled geometry.

Then, at block 38, the angle at which the estimated angle autocorrelation function corresponding to the best fit curve falls to half of its peak value is determined. This angle is identified as the expected decorrelation angle. Conveniently, the identified expected decorrelation angle may be stored in the database 14.

The method of determining the best fit curve of RCS angle autocorrelation functions according to blocks 30 to 36 may be regarded as a Monte Carlo approach.

Figure 3:
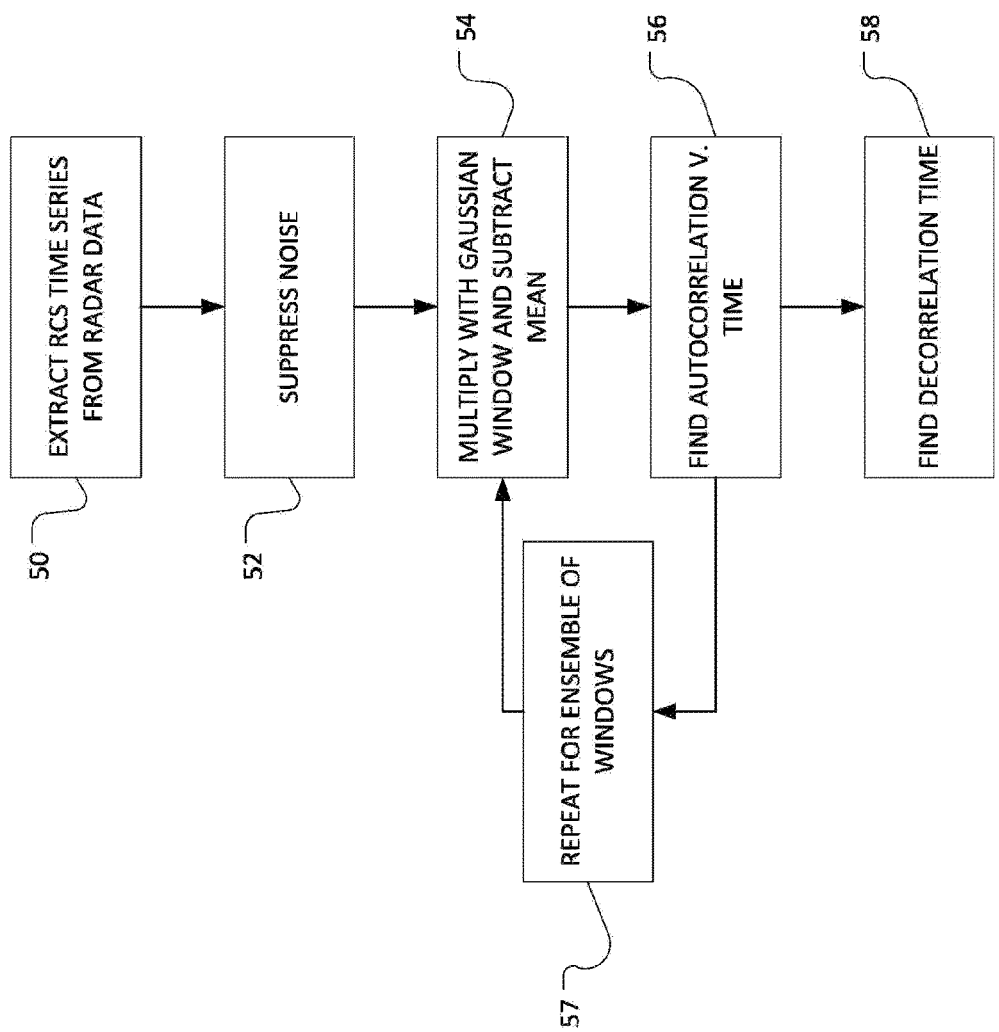
FIG. 3 is a flowchart of a method to determine a decorrelation time in the first embodiment.

At block 40, a decorrelation time is determined from radar data measurements of the target object. These radar data measurements may be referred to as a radar data set. The determined decorrelation time is then used in concert with the expected decorrelation angle determined in block 38 to determine the rotation rate of the target, as will be discussed in more detail below. FIG. 3 shows a flow chart of an embodiment of a process to determine the decorrelation time that may be used in block 40. Conveniently, the expected decorrelation angle may be obtained from the database 14.

At block 42, the process calculates the rotation rate of the target. This is done by dividing the determined decorrelation angle by the determined decorrelation time to calculate a rotation rate. It will be understood that the RCS decorrelation angle of most objects is a relatively small angle, typically only a few degrees. As a result, the target only needs to be tracked by the radar array 10 as the target rotates through this small RCS decorrelation angle of only a few degrees during a single pass in order for the present approach to detect the rotation of the target and determine the rotation rate. In contrast, conventional approaches using light curve or radiometric techniques require observation of a target over one or more full rotations.

The output of block 42 is a determined rotation rate, that is, angle/time, for the target based upon radar data from a single radar data set from a single pass of the target across the field of view of the radar array 10. The determined rotation rate may be stored in the database 14.

If no decorrelation time can be determined in block 40, for example because the radar data measurements of the target object do not change, it may be concluded that the target object is not rotating. Optionally, in this case, the process may identify the rotation rate as zero, skip block 42, and proceed directly to block 44. This may avoid waste of computing resources in carrying out block 42 unnecessarily.

This process is then repeated, as indicated by block 44, for a plurality of independent radar data sets. These independent radar data sets may, for example, may be radar data from different passes of the target across the radar array 10, or radar data from different parts of the same pass of the target across the radar array 10, or radar data regarding the target as observed by other radar systems. It will be understood that a target object can be identified as being the same target object on different passes over the same or different radar arrays, for example by using the gathered radar data to determine the orbital path and timing, or ephemeris, of the target object and assuming that target objects having matching orbital paths and timings, or ephemerides, must be the same object.

Then, at block 46 the process compares the plurality of determined rotation rates for the target output by block 42 based on the respective plurality of independent radar data sets and identifies the highest determined rotation rate from all of the plurality of independent radar data sets. The, at block 48 this identified highest determined rotation rate is output as the best-fit rotation rate of the target object. The best-fit rotation rate may be stored in the database 14.

As is discussed above, the target only needs to be tracked by the radar array 10 as the target rotates through a small RCS decorrelation angle of only a few degrees during each pass in order for the present approach to detect the rotation of the target and determine the best fit rotation rate over a number of passes. In contrast, conventional approaches using light curve or radiometric techniques require observation of a target over one or more full rotations in a single pass in order to determine rotation rate. Accordingly, the processes described herein may allow rotation of objects and their rotation rates to be determined in situations where conventional approaches cannot be used. Examples of such situations include objects which are not within the field of view of the radar for long enough to complete a full rotation.

This best-fit rotation rate of the target object may be used as the tumbling characteristic of the target object. In other examples the best-fit rotation rate of the target object may be compared to one or more thresholds and whether the best-fit rotation rate of the target object is above or below a predetermined threshold, or within a predetermined band may be used as the tumbling characteristic of the target object instead of the actual rotation rate. In other examples a determination whether or not the target object is non-rotating (i.e., has no detectable rotation) may be used as the tumbling characteristic of the target object.

As is explained above, a goal of the process is to determine the rotation rate of the target object. In practice, for target objects which are rotating this rotation will be about a rotation axis at some angle $\theta$ to the line of sight between the radar array 10 and the target object at any given time. The direction of the rotation axis corresponds to the direction of the spin angular momentum vector of the target object. The orientation of the rotation axis/angular momentum vector for a target object is generally not known. Further, the orientation of the rotation axis/angular momentum vector for a target object is fixed in the frame of reference of the object itself, and is not fixed relative to the surface of the earth, so that the angle $\theta$ will vary over time as the radar array 10 moves with the rotating Earth. Accordingly, the angle $\theta$ may generally have any value for any specific radar data set.

For geometrical reasons the determined rotation rate from a single radar data set will be the actual 'true' rotation rate of the target object multiplied by $\sin \theta$ for that radar data set, where $\theta$ is the angle between the line-of-site to the target object from the radar array 10 and the angular momentum vector of the target object. This is because the rate of change of the relative distances of different radar scattering elements from the radar array 10 as a result of rotation of the target object, which changes in relative distances cause changes in the RCS of the target object, for a radar array 10 with a line of sight at an angle θ, will be multiplied by sin θ for geometric reasons. As a result, the determined decorrelation time will be divided by sin θ, and thus the determined rotation rate will be multiplied by sin θ.

Accordingly, when comparing the plurality of determined rotation rates in block 46, the data set having the highest determined rotation rate will provide the determined rotation rate which is closest to the actual true rotation rate of the target object, because this will be the data set where the angle, θ, between the line-of-site to the target and its angular momentum vector is closest to 90 degrees, and so the value of sin (θ) is closest to 1. As a result, the identified maximum determined rotation rate identified in block 46 and output in block 48 is the best estimate of the actual rotation rate of the target object.

Repeating the process for a plurality of independent radar data sets gathered on different passes, or by other radar systems, and selecting the highest determined rotation rate in block 46, may avoid the possible problem that on a specific pass of the target object, if the angle, θ, between the line-of-site to the target and its angular momentum vector is 0 degrees, or very close to 0 degrees, the rotation may not produce any measurable change in the RCS of the target object, so that a rotating target object could be misidentified as non-rotating. As discussed above, the angle θ will vary over time as the radar array 10 moves with the surface of the rotating Earth, and the angle θ will of course vary for radars at different locations, so that repeating the process in this way may overcome this possible problem.

As mentioned above, FIG. 3 shows a flowchart of an embodiment of a process to determine the decorrelation time from radar data measurements of the target object which may be used in block 40 in FIG. 2. The flowchart of FIG. 3 shows the process used to determine the decorrelation time from the radar data measurements of the target object of a single radar data set. When the process of FIG. 2 is repeated for a plurality of independent radar data sets the process of FIG. 3 is repeated for each of the plurality of radar data sets. In some examples alternative methods may be used to determine the decorrelation time of the target object.

In the flowchart of FIG. 3, at a block 50, the process extracts radar cross section (RCS) time series data at regular intervals from the radar data provided by the radar array 10. The RCS time series data is computed from the Signal-to-Noise (SNR) ratios of the received radar data.

Optionally, the extracted RCS time series data may undergo noise suppression at block 52. In one embodiment the noise suppression may apply a low-pass filter to the RCS time series data in block 52. However, in some examples noise suppression may not be required.

Then, in a block 54, the RCS time series data, which may have been noise suppressed/filtered in optional block 52, undergoes multiplication with a window and the mean is subtracted to form windowed data. As examples, without limitation, the window may be Gaussian, Hamming, Hann, Sine, Tukey. However, in some examples other types of windows may be used.

A window is a number of samples. Because the samples making up the RCS time series data are taken over a period of time at regular intervals, the window represents a time period over which the samples were taken. In one embodiment, the autocorrelation functions are calculated in a window ranging from 11000 samples in a time period of predetermined length, referred to here as the length of the window. In one embodiment, the window length is 18 milliseconds, so the samples range from 18 milliseconds to 18 seconds.

Then, at a block 56, the process calculates the autocorrelation function versus time using the windowed RCS time series data from block 54. This autocorrelation function calculation is repeated for an ensemble of different windows, such as different combinations of window lengths and positions within the time series of the RCS time series data, as indicated at block 57. The resulting autocorrelation function versus time data is then used to determine the decorrelation time of the target object. In one embodiment, similar to the finding of the autocorrelation angle, the determined decorrelation time is the consensus time delay at which the autocorrelation falls to a value that is half its peak value over the ensemble of autocorrelation function.

The process of FIG. 2 then uses the determined decorrelation time and the expected decorrelation angle in block 42 to find the rotation rate.

Figure 6:
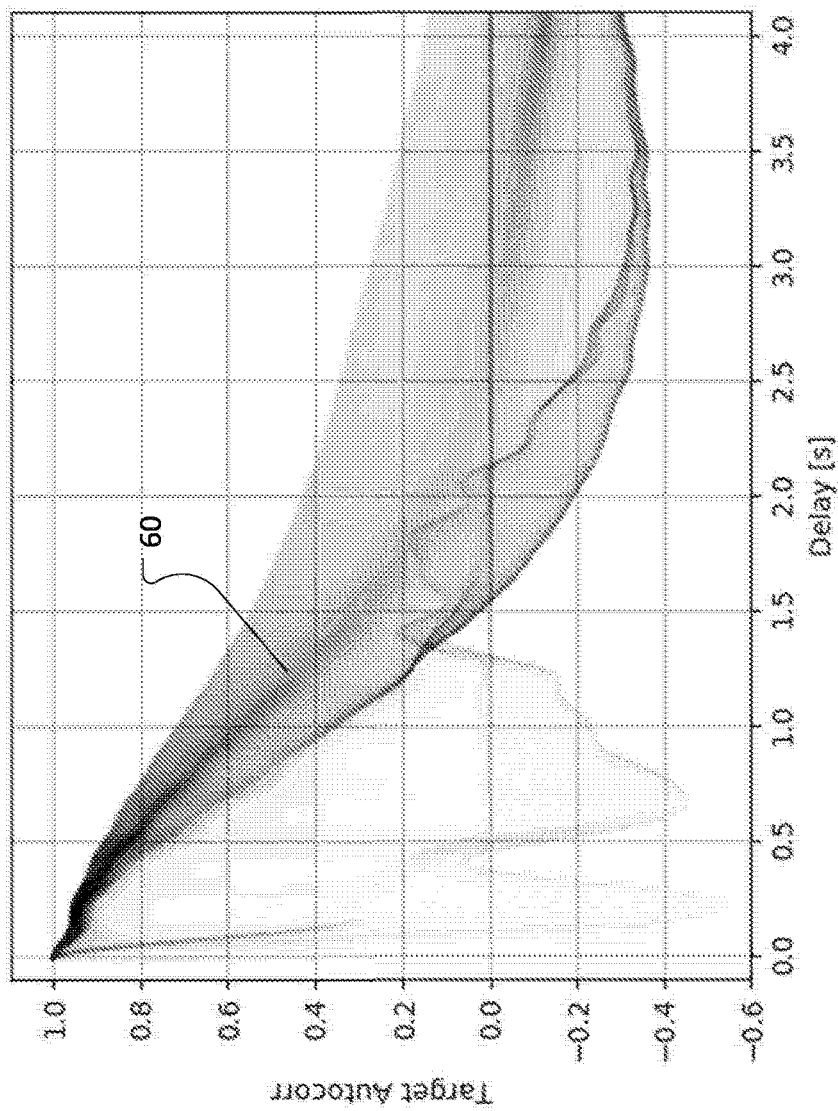
FIG. 6 shows graphs of target and noise autocorrelation data versus window length.

The purpose of windowing in block 54 of the process of FIG. 3 is to reduce the susceptibility of the analysis to edge effects and any slowly varying systematic errors. FIG. 6 shows an example of a graph of calculated target autocorrelation function values versus delay time. The graph of FIG. 6 shows a large number of plots of different calculated target autocorrelation functions values versus delay times for different window lengths as a grey-scale where the darkness of the graph corresponds to greater numbers of lines plotting calculated autocorrelation function values versus delay time. In looking at the graph of FIG. 6, one can see that the autocorrelation function is window-size dependent, but that there is a convergence 60 of the autocorrelation curves at certain values for different window lengths, which indicates that this is a robust signal corresponding to a real signal. The process of FIG. 3 interprets this convergence 60 of values as the consensus time delay discussed above and caused by rotation of the target object.

In the embodiment of FIG. 2 the expected decorrelation angle of the target object 16 is calculated in blocks 30 to 38. This is not essential, and in other examples different methods may be used to determine the expected decorrelation angle of the target object. In such examples the expected decorrelation angle can then be used in blocks 40 to 48 to determine the rotation rate in a similar manner to the expected decorrelation angle calculated by blocks 30 to 38.

In some examples where the identity of the target object is known it may be possible to calculate the expected decorrelation angle from the structure of the target object, if the structure and the resulting radar reflective properties are known in sufficient detail. The radar reflective properties of the structure may, for example, be determined from details of the structure provided by a satellite operator, or from a catalogue of satellite designs. In other examples where the target object, or an identical object, can be accessed before it is launched, it may be possible to measure the radar cross section of the object at different angles and use these measurements to calculate the expected decorrelation angle. Other methods of determining the expected decorrelation angle of an object may also be used.

Figure 7:
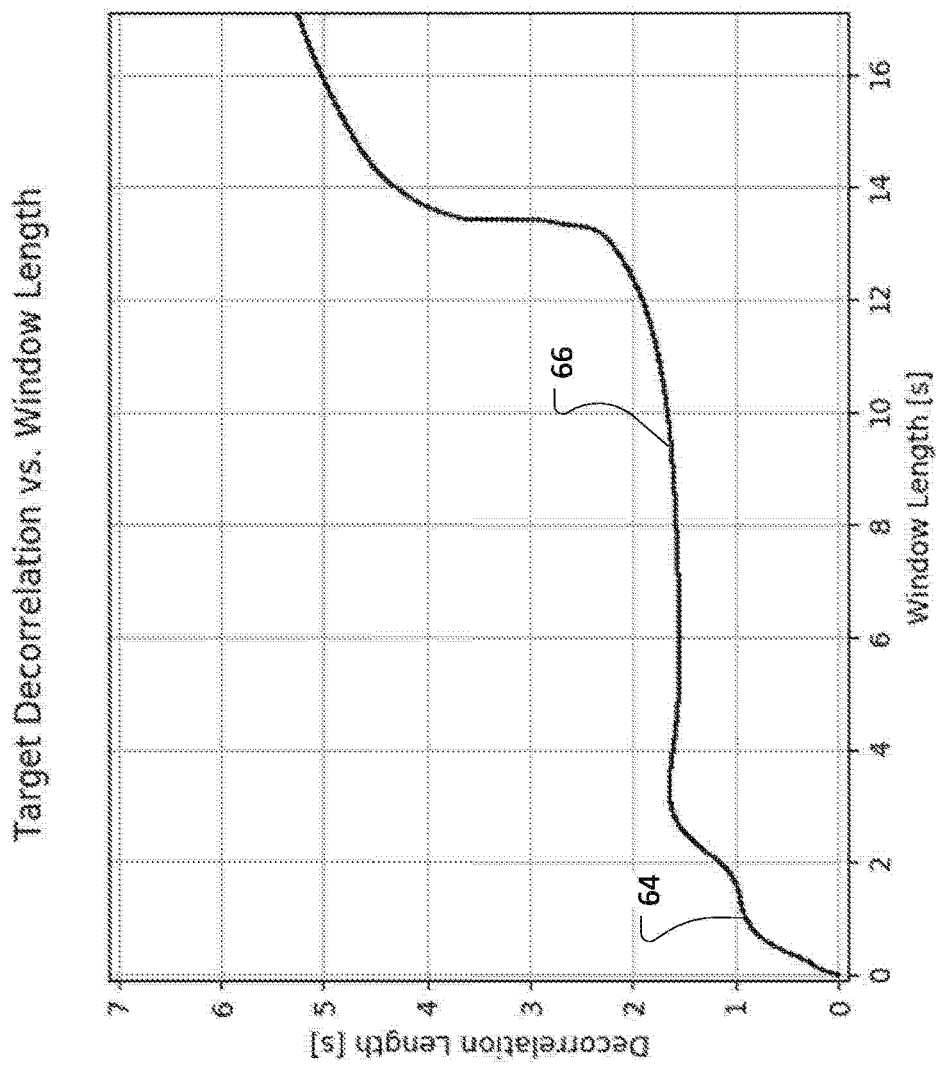
FIG. 7 shows a graph of target and noise decorrelation versus window length.

FIG. 7 shows a graph of the calculated decorrelation time as a function of window length used for a single radar data set for a target object. The decorrelation time is calculated from the autocorrelation analysis of the respective different window lengths. At short window lengths there is a cliff leading down to the noise decorrelation, such as at 64. However, there is typically a broad plateau across several seconds, such as 66, which is likely where the real rotational signal resides. At longer lengths, meaning at larger window sizes, there is a rise due to discontinuity at the ends of the time series and slowly varying systematic errors. One solution to avoiding this rise at larger window sizes is to calculate the rotational autocorrelation with time windows having window lengths within the broad plateau, such as windows of less than 12 seconds in the illustrated embodiment. Accordingly, in some examples, in block 56 the calculation of the autocorrelation function versus time using the windowed RCS time series data may include determining a range of window lengths corresponding to this plateau and then calculating the autocorrelation function versus time using window lengths within this range.

Figure 8:
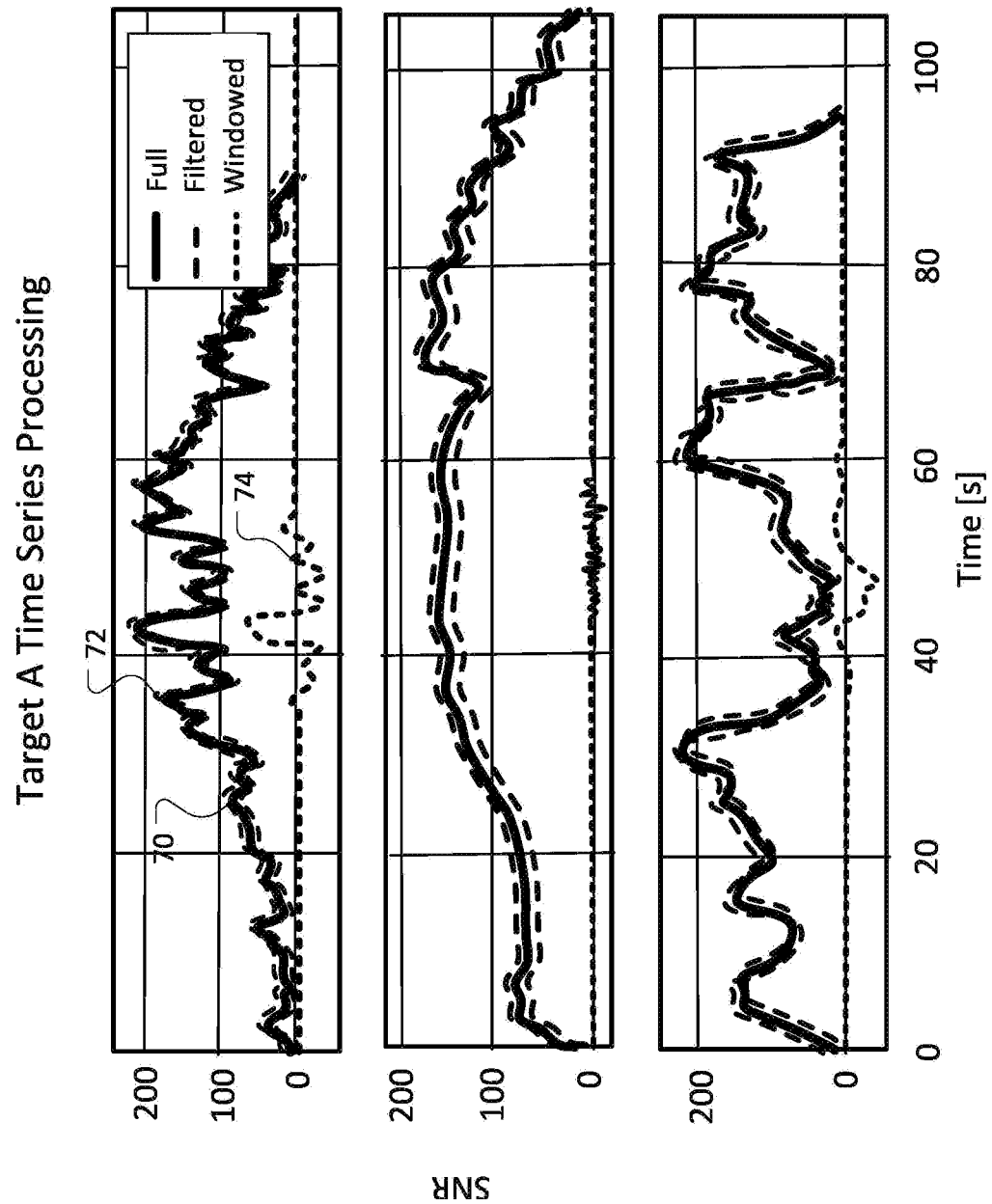
FIGS. 8 and 9 show graphs related to a target.
Figure 9:
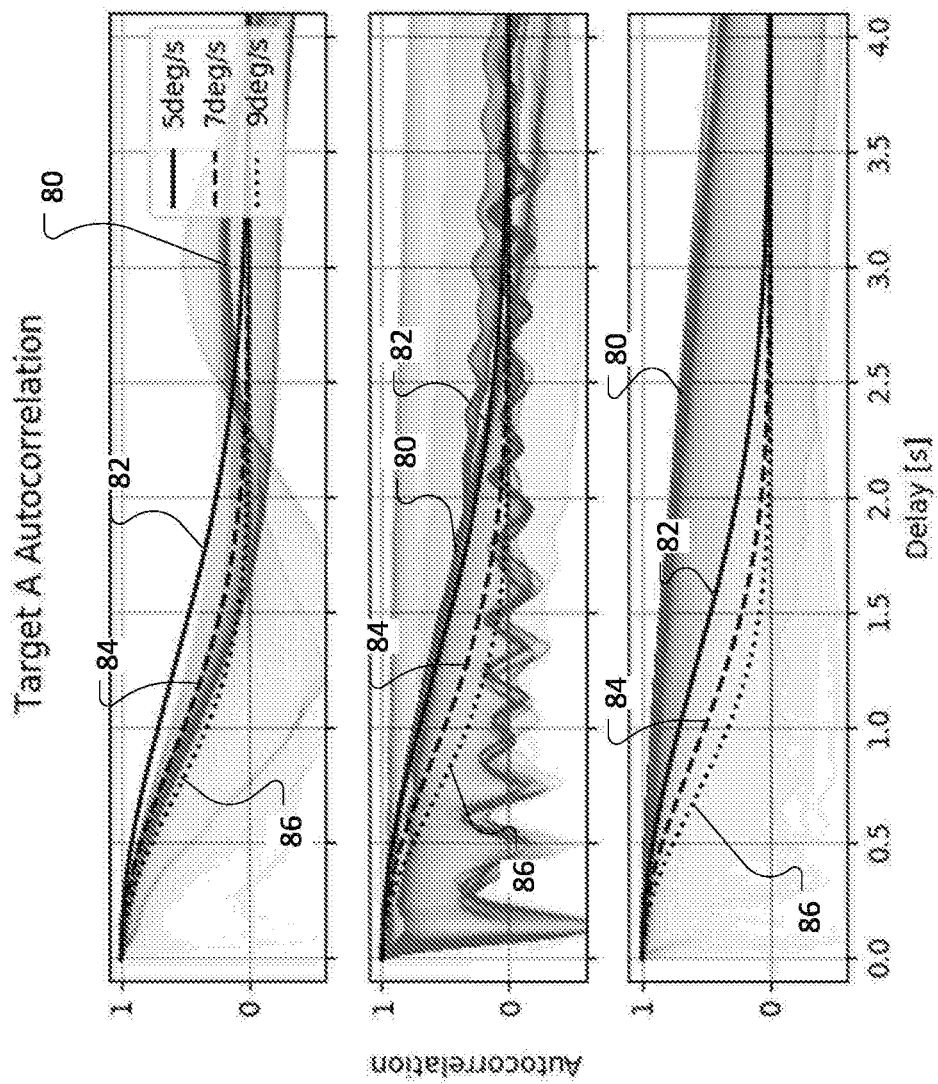

Returning to FIG. 2, the process results with a best-fit rotation rate for the target object, which may be used as the tumbling characteristic of the target object. Having discussed the process in general terms, the discussion now turns to examples of the analysis as applied to real data. FIGS. 8-15 show different examples of determining a tumbling characteristic of a space object. FIGS. 8 and 9 show an embodiment of time series processing for a signal that indicates an object that is tumbling and its associated rate. A time series consists of a series of data points indexed in time order. As done here, the time series is a sequence taken as successive equally spaced points in time. Time series can suffer from edge effects that can skew the results.

In FIG. 8, in the top graph, the outer lines on the top line are the raw SNR sample data shown as a solid line 70. The dashed line 72 is the raw SNR sample data after undergoing low-pass filtering. In this illustrated example low-pass filtering was applied to autocorrelations of a single object data set. Noise autocorrelation found that there was a very narrow, but significant spike at the 0-delay. The main effect of the low-pass filtering was to suppress the 0-delay noise spike, and the general autocorrelation shape was not affected, so low-pass filtering is appropriate in this example. The bottom dotted line 74 represents windowed data, of a window length of about 18 seconds. Each graph in FIG. 8 represents one pass of the object over the radar, that is, across the field of view of the radar. The same convention for the lines is used in FIGS. 8, 10, 12 and 14.

FIG. 9 shows autocorrelation results of the data from FIG. 8. Again, each graph represents one pass of the object over the radar. The convergence of curves at long decorrelation times is due to time series edge effects. Each graph represents different samples. In the following graphs, curve 80 is the autocorrelation curve. Curve 82 represents a theoretical model curve for a 5 degree/second rotation rate. Curve 84 shows the model of curve at 7 degrees/second, and curve 86 represents the model at 9 degrees/second. The matching of the autocorrelation curve 80 to the curves 82 to 86 corresponding to different rotation rates provides an explanatory illustration of how a rotation rate is found in the block 42 of FIG. 2. The same convention for the lines is used in FIGS. 9, 11, 13, and 15.

In FIG. 9, the top graph shows a series of samples in which the strongest rotation signals matches the theoretical model at 7-8 degrees/second rotation. The middle graph shows a series of samples including a rotational signal that matches the theoretical model of 5 degrees/second. The bottom graph shows a series of samples which do not show a strong rotational signal below the windowing envelope. Therefore, the strongest indication is that the satellite is rotating at 7-8 degrees/second.

Figure 10:
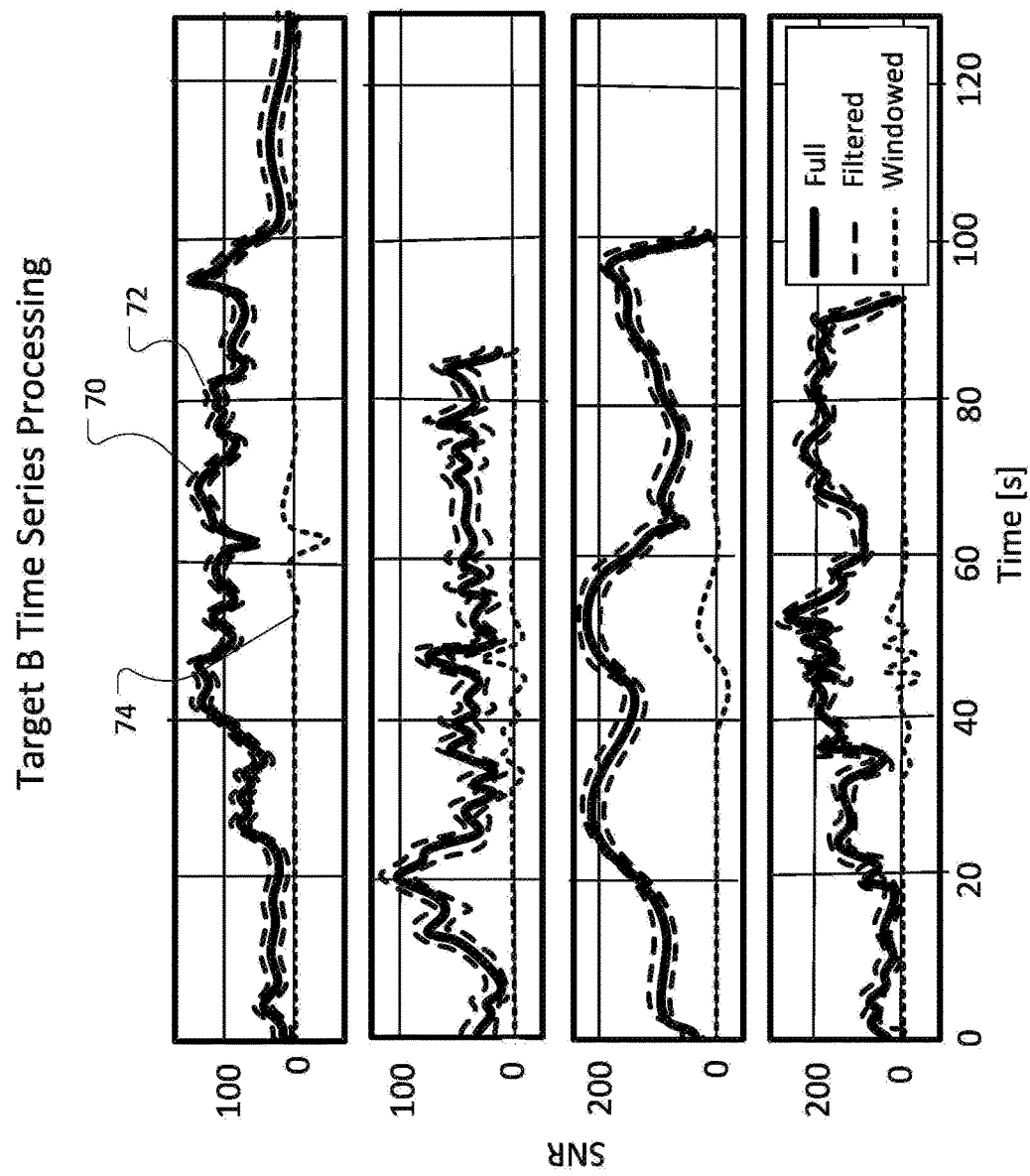
FIGS. 10 and 11 show graphs related to another target.

FIG. 10 shows a times series for a second object. This set of samples consists of four passes of an object, with each of the four graphs showing samples corresponding to a single pass of the object. Again, the raw sample data is shown as solid line 70, the low-pass filtered data is shown as dashed line 72 and the windowed data is shown as dotted line 74.

Figure 11:
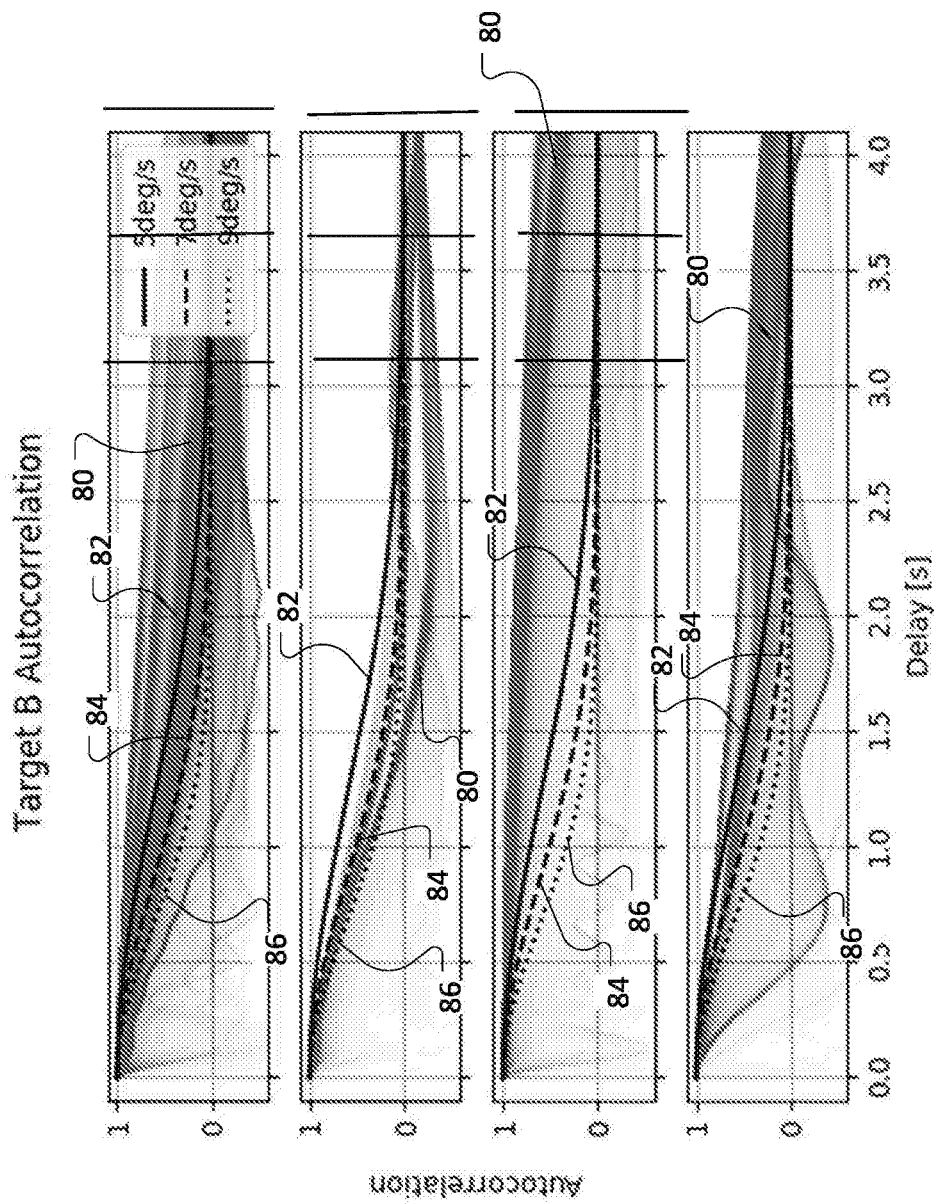

FIG. 11 shows the autocorrelation curves of the time series from FIG. 10, with the four graphs of FIG. 11 corresponding to respective ones of the four graphs of FIG. 10. Again, the convergence of the curves at long decorrelation times is due to the time series edge effects. In the graphs of FIG. 11, the top graph shows a set of curves comprising a signal between 7-9 degrees/s, the second graph down shows set of curves comprising a signal between 8-9 degrees/s, the third graph down shows a set of curves which do not comprise a strong rotational signal below the windowing envelope, and the bottom graph shows a set of curves comprising a signal between 7-9 degrees/s. Therefore, the strongest constraint is between 8-9 degrees/s as the rotation rate.

In the embodiment described above, the data may optionally be filtered in block 52. In the described embodiment this optional filtering is low-pass filtering. In other examples the data may undergo high-pass filtering additionally, or alternatively, to the low pass filtering. The process looks to isolate frequencies of interest relative to the noise, so which type of filtering are appropriate in any specific example may depend upon the data set and the equipment used to gather the data.

Figure 12:
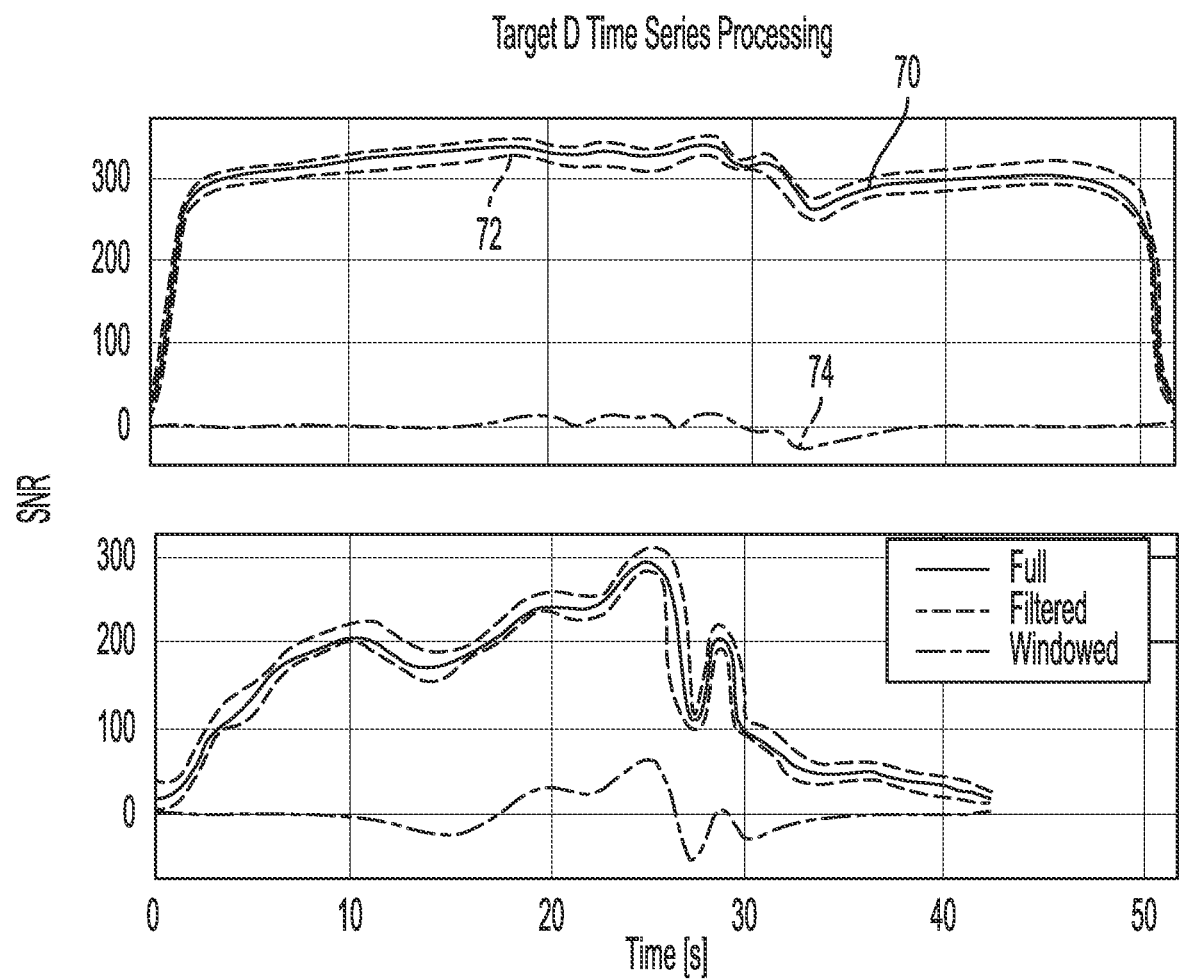
FIGS. 12 and 13 show graphs related to yet another target.
Figure 13:
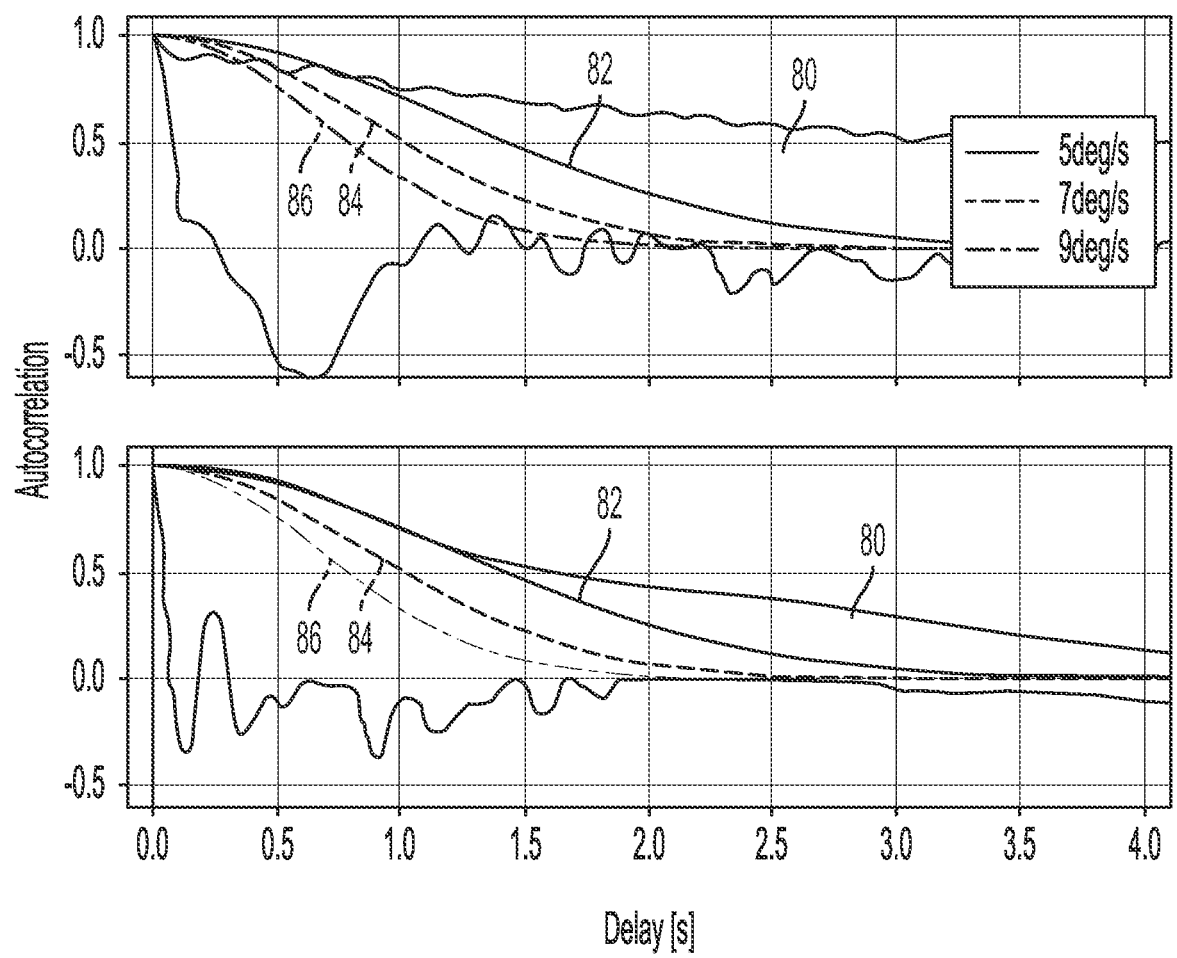

Another issue that can arise and may be identified can results from a pointing error seen at high elevation. FIG. 12 shows a time series of a fourth object. This object has data from two passes, and each of the graphs of FIG. 12 shows the SNR data from a respective pass. FIG. 13 shows two graphs of the respective autocorrelation curves for the data of the graphs of FIG. 12. Neither set of data gives a strong rotational constraint. The hint of signal in the bottom graph is likely due to the pointing error seen at high elevation. In some examples where the radar array is subject to pointing errors at high elevation the system can define levels of the signals such that the slight signal of the bottom panel can be used to identify pointing errors. The system can also use additional diagnostics from the radar instrument to identify data that may be affected by pointing errors. In some examples the identified data may then not be used to calculate rotation rate. This may allow elimination of irrelevant data sets and inaccuracies due to pointing errors at high elevation.

The embodiments described above allow the rotation rate of an orbital object to be determined and used as a tumbling characteristic of the object.

In a further embodiment the process may be extended to determine the orientation of the angular momentum vector of a rotating object, that is, the orientation of the axis of rotation. In some examples the orientation of the angular momentum vector may then be used as a tumbling characteristic of the object. In other examples both the rotation rate and the orientation of the angular momentum vector may be used as tumbling characteristics of the object.

Figure 14:
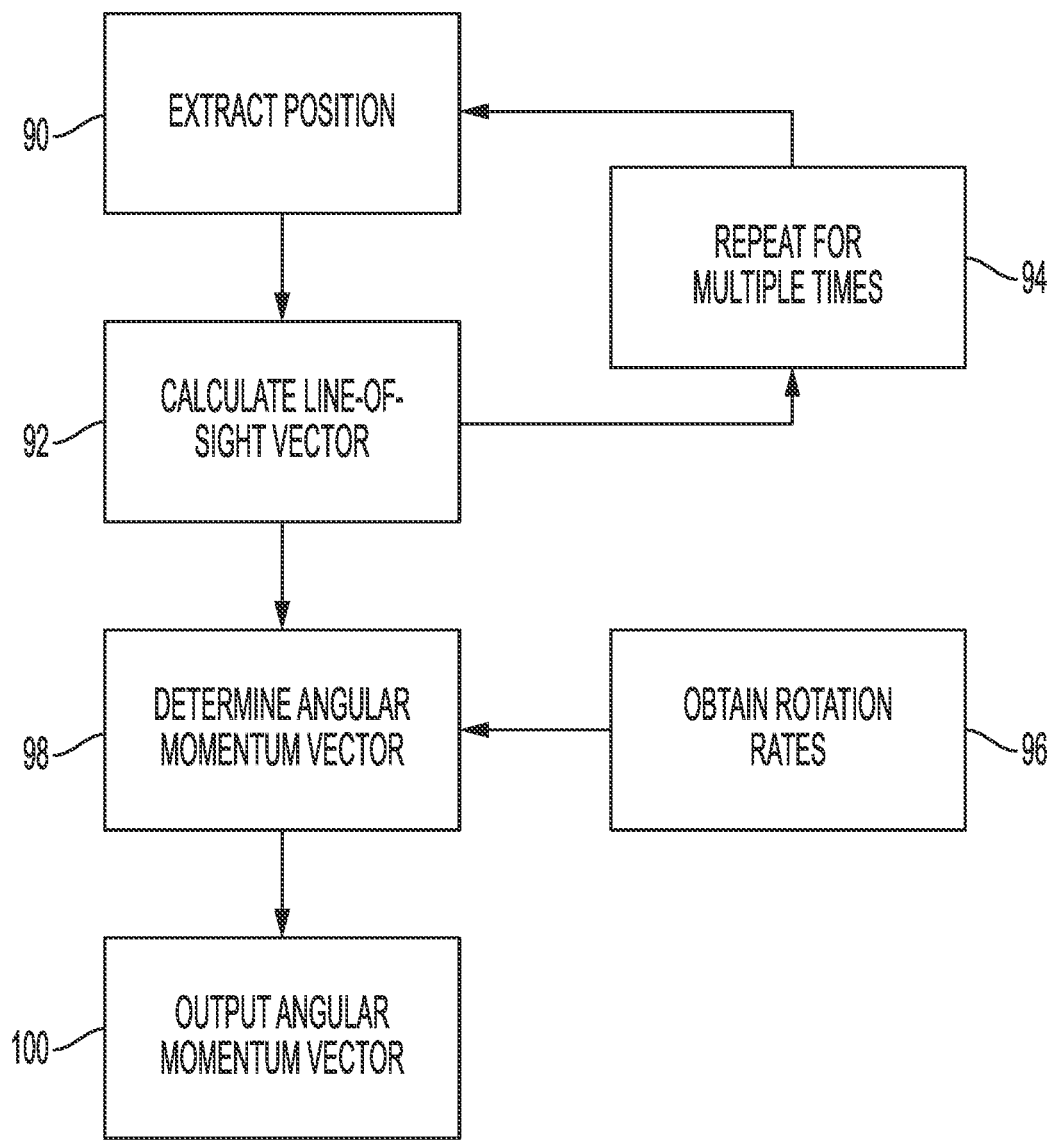
FIG. 14 shows a flowchart of a method to determine the rotation vector of resident space objects according to a second embodiment.
Figure 15:
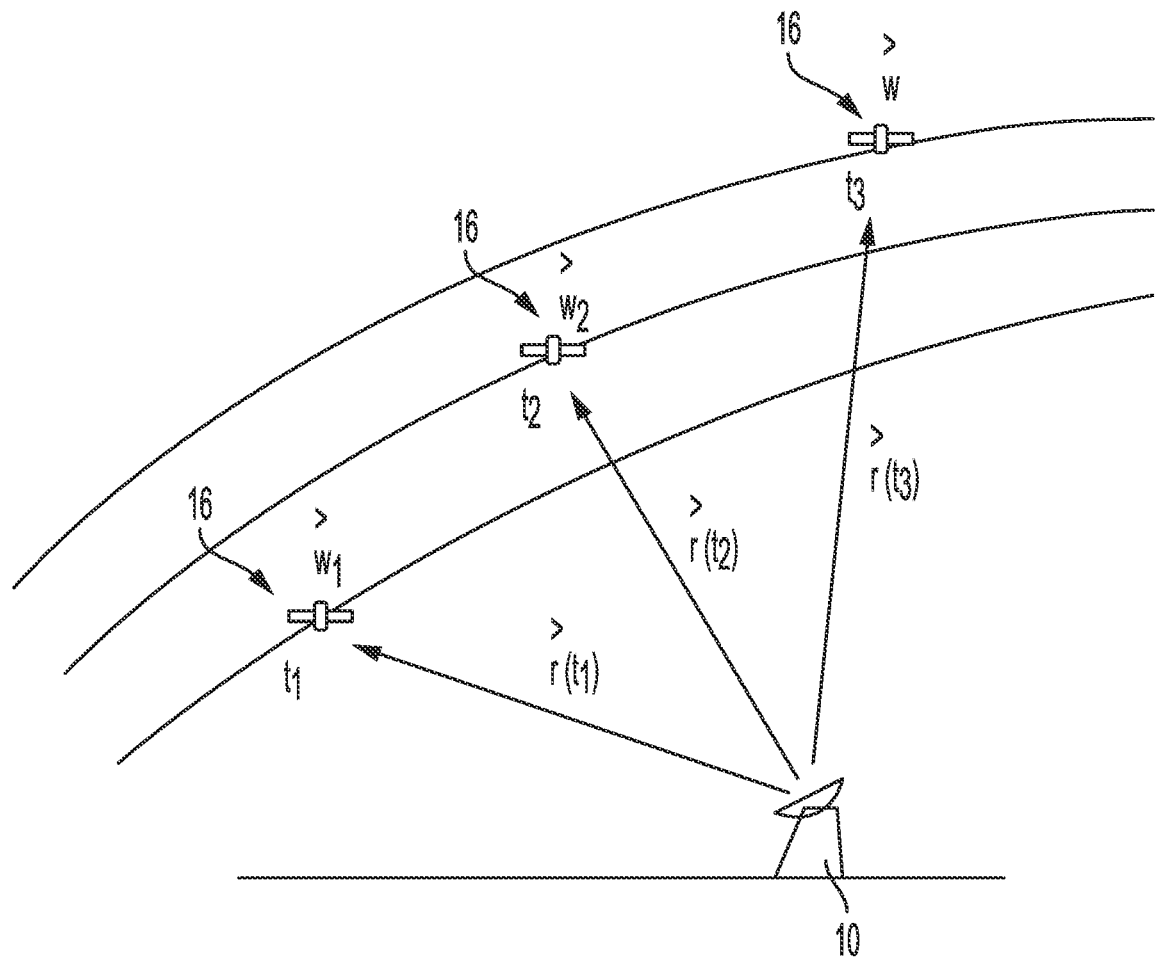
FIG. 15 shows an explanatory diagram of the method of FIG. 14.

FIG. 14 shows a flowchart of a further embodiment of an overall process to determine tumbling characteristics of resident space objects (RSOs) which is able to determine the orientation of the angular momentum vector of a rotating object. The process of the embodiment of FIG. 14 may, for example, be carried out by the process of the embodiments of FIGS. 2 and 3 by the system of FIG. 1. FIG. 15 is an explanatory diagram showing some of the concepts of the process of FIG. 14.

The process of FIG. 14 begins by selecting a target object 16 to analyze in the gathered radar data, and determining the position of the target object 16 at a time $t_n$ in a block 90. Then, in block 92 the process determines the line of sight vector $\vec{r}(t)$ between the radar array 10 and the target object 16. The line of sight vector between the radar array 10 and the target object 16 at a time $t_n$ may be designated $\vec{r}(t_n)$.

This process is repeated, as indicated by block 94 for at least three different times. The number of different times for which the blocks 92 and 94 are repeated may vary in different examples, provided the number is at least three. An example of this is illustrated in FIG. 15, where the position of the target object 16 at first to third different times $t_1$, $t_2$ and $t_3$ are shown, together with the respective calculated line of sight vectors $\vec{r}(t_1)$, $\vec{r}(t_2)$ and $\vec{r}(t_3)$ at times $t_1$ to $t_3$ respectively.

Then, in a block 96, the rotation rates of the target object 16 at each of the at least three different times $t_n$ are obtained. These rotation rates are calculated by the decorrelation angle technique according to the process of FIG. 2, and possibly also the process of FIG. 3. These rotation rates of the target object 16 are the rotation rates calculated in the block 42 of the process of FIG. 2, and not the determined rotation rate output by the block 46.

Then, in a block 98 the process determines the angular momentum vector $\vec{w}$. An explanation of one manner in which this can be done is as follows.

The line of sight vector $\vec{r}(t)$ between the radar array 10 and the target object 16 may be rewritten in terms of the cartesian unit vectors as follows:

$$\vec{r}(t) = x(t)\vec{i} + y(t)\vec{i} + z(t)\vec{i} \quad \text{Equation (1)}$$

Equation (1) can be rewritten to define the unit vector as follows:

$$\hat{r}(t) = \left(\frac{x(t)}{r(t)}\right)\vec{i} + \left(\frac{y(t)}{r(t)}\right)\vec{j} + \left(\frac{z(t)}{r(t)}\right)\vec{k} \quad \text{Equation (2)}$$

$$\text{where } r(t) = \sqrt{x^2(t) + y^2(t) + z^2(t)}$$

Each of the calculated rotation rates w(t) corresponds to a projection of the angular rotation vector $\vec{w}$ into a plane perpendicular to the line of sight vector $\vec{r}(t)$ between the radar array 10 and the target object 16 at the time t. Accordingly, the calculated angular rotation rate is:

$$w(t) = |\hat{r}(t) \times \vec{w}|. \quad \text{Equation (3)}$$

where x denotes the cross product.

As has been explained above, the calculated angular rotation rate can also be expressed as:

$$w(t) = w \sin \theta(t) \quad \text{Equation (4)}$$

where θ(t) is the angle between the line of sight vector $\vec{r}(t)$ and the angular rotation vector $\vec{w}$.

From the above equations, it can be shown that;

$$w^2(t) = w^2 - (\hat{r} \cdot \vec{w})^2 \quad \text{Equation (5)}$$

$$\text{where } w^2 = \vec{w} \cdot \vec{w} = w_x^2 + w_y^2 + w_z^2 \quad \text{Equation (6)}$$

and the components of $\vec{w}$ are: $\vec{w} = w_x \vec{i} + w_y \vec{j} + w_z \vec{k}$
It follows that:

$$w^2(t) = w^2 - \left(\frac{x(t)}{r(t)} w_x + \frac{y(t)}{r(t)} w_y + \frac{z(t)}{r(t)} w_z\right)^2 \quad \text{Equation (7)}$$

The values of x(t), y(t) and z(t) will be known from the determination of the position of the target object 16 in block 90, and w(t) is the measured and calculated projected rotation rate obtained in block 96. Accordingly, equation (7) has three unknowns, $w_x$, $w_y$ and $w_z$, where $w^2 = w_x^2 + w_y^2 + w_z^2$, as set out in Equation (6).

Accordingly, in the block 98 the process can solve equation (7) to determine, $w_x$, $w_y$ and $w_z$, and thus $\vec{w}$, provided that at least three measurements were made at different times in block 90. In block 98 the solution can be done by way of a non-linear least squares fitting. In other examples equation (7) may be solved in other ways.

The $\vec{w}$ determined in block 98 is then output in block 100.

The uncertainty in the fitted $w_x$, $w_y$ and $w_z$ values, and thus the uncertainty in $\vec{w}$ will depend upon the angular spread of the line of sight vectors $\vec{r}(t)$ measured at the different times, with a larger angular spread in the line of sight vectors providing more certainty. In practice, for a single pass of the RSO 16 over the radar array 10, the different line of sight vectors $\vec{r}(t_n)$ measured at different times $t_n$ will generally be very nearly coplanar, so that the estimate of the angular rotation vector $\vec{w}$ may be highly uncertain and may be inaccurate. Accordingly, it may be preferred to measure the line of sight vectors $\vec{r}(t_n)$ at different times $t_n$ during different passes of the RSO 16 over the radar array 10. This will ensure that the line of sight vectors $\vec{r}(t_n)$ at different times $t_n$ will be non-coplanar, so that the angular rotation vector $\vec{w}$ can be accurately estimated.

In general, the precision with which the angular rotation vector $\vec{w}$ can be determined will depend upon the precision of the rotation rate estimates $w(t_n)$, the precision of the line of sight vectors $\vec{r}(t_n)$, and the variance in the pointing directions of the line of sight vectors $\vec{r}(t_n)$.

In some examples the value of $\vec{w}$ determined in the process of FIG. 14 may be used to improve the best-fit rotation rate of the target object identified in block 46 of FIG. 2.

In the embodiment of the process of FIG. 14 described above the position of the target object 16 at a time $t_n$ is determined from radar data, and this position is then used to determine the line of sight vector $\vec{r}(t_n)$ between the radar array 10 and the target object 16 at the time $t_n$. It is not essential to use such a two-stage process. In some examples it may be possible to determine the line of sight vector $\vec{r}(t_n)$ directly from the radar data.

In the manner set out above, a system and method can determine and track the tumbling characteristics of resident space objects, such as satellites. As is explained above, the determined tumbling characteristics may comprise either or both of a speed of rotation of an object and the orientation of the angular momentum vector of an object. Identification of tumbling characteristics of space objects may allow correct functioning of satellites to be determined by identifying whether their tumbling characteristics match their intended or desired tumbling characteristics. For example, if a satellite is intended to be non-rotating and is determined to be rotating at any measurable rate this may indicate some malfunction or failure of the satellite. Further, identification of tumbling characteristics of space objects may allow the lifecycle stage of satellites to be determined. Identification of tumbling characteristics may also allow the system operator to notify object owners that their objects are tumbling, or may allow adjustment of other objects' paths to get out of the way, among others.

The methods set out above may also allow development of tumbling characteristic profiles of the objects which can be used as object signatures to allow identification and/or long-term tracking of the objects. The determined tumbling characteristic(s) of resident space objects may be determined and recorded as an object fingerprint. Subsequently, the identification of a detected resident space object having tumbling characteristic(s) matching the fingerprint may indicate that the detected resident space object is the same resident space object.

In some examples, measured or determined parameters of a resident space object may be used instead of, or in addition to the determined tumbling characteristic(s) themselves. For example, the RCS characteristics or RCS metrics, or the calculated decorrelation time, or a number of these parameters may be recorded as at least a part of an object fingerprint.

The matching of the fingerprint may be carried out as a probabilistic assessment, where a number of different parameter values of a resident space object are determined and compared to corresponding parameter values of a recorded object fingerprint, and based on how similar each of the determined parameters is to the recorded value of the fingerprint a probability of the resident space object being the fingerprinted object can be assessed.

In some examples an object fingerprint may comprise tumbling characteristic profiles and other parameters of a resident space object. In one example, an object fingerprint may comprise tumbling characteristic profiles and the orbital path of the resident space object.

In one example the fingerprinting may comprise comparing the determined at least one tumbling characteristic of the object to a stored record of a previously determined at least one tumbling characteristic of a previous object; and based on the comparison, determining whether the object and the previous object are the same object.

The embodiments described above employ windowing of the RCS time series data to remove edge effects. In some examples where the RCS time series data has suitable properties this windowing may not be necessary.

The embodiments described above comprise one or more fixed radar arrays on the Earth. In other examples the some or all of the radars may be mounted on one or more mobile platforms, such as a satellite, or may be mounted on the surface of other bodies.

The embodiments described above use one or more radar arrays. In other examples other types of radar which are not arrays may be used.

The embodiments described above characterize RSOs in Earth orbit. In other examples objects in orbit around other celestial bodies may be characterized.

The embodiments described above include some examples where radar data obtained on different passes of an object and/or radar data obtained from different radar devices are used. It will be understood that the system will include suitable storage and communications devices to enable this. Many arrangements for the storage and transmission of data are well known to the skilled person, so these do not need to be explained herein.

The embodiments described above explain how a tumbling characteristic of a single object can be determined, for simplicity and clarity. It will be understood that the described processes can be repeated for a plurality of different objects in order to determine respective tumbling characteristics of the plurality of different objects.

In the above embodiments some functionality may be provided by software. In other examples this functionality may be provided wholly or in part in hardware, for example by dedicated electronic circuits.

In the above embodiments the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Computer programs and computer executable instructions may be provided using any computer-readable media that is accessible by computing based device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Although the system is shown as a single device it will be appreciated that this system may be distributed or located remotely and accessed via a network or other communication link (e.g. using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiments is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of determining at least one tumbling characteristic of an object, comprising:
    obtaining an expected radar cross section (RCS) decorrelation angle of an object;
    obtaining radar data, via a radar array, of the object;
    determining, by one or more processors, a decorrelation time of the RCS of the object from the radar data of the object;
    determining, by the one or more processors, at least one tumbling characteristic of the object based on the obtained decorrelation angle and the determined decorrelation time;
    generating, by the one or more processors, a notification of the at least one tumbling characteristic; and
    transmitting, by the one or more processors, an alert corresponding to the notification to a display of a system operator.

2. The method of claim 1, wherein determining the at least one tumbling characteristic of the object comprises:
    dividing the obtained decorrelation angle by the determined decorrelation time.

3. The method of claim 1, wherein the at least one tumbling characteristic of the object comprises a rotation rate of the object.

4. The method of claim 3, and further comprising:
    repeating the obtaining radar data, determining a decorrelation time, and dividing the obtained decorrelation angle by the determined decorrelation time for a plurality of radar data sets of the object at different times to determine the rotation rate of the object for each of at least three radar data sets;
    determining a line of sight vector between a radar gathering the radar data and the object at each of the different times;
    solving a set of linear equations for each of the different times to determine an angular rotation vector of the object.

5. The method of claim 4, wherein the linear equation for each of the different times is:

$$w(tn) = 1/\vec{Ir}(t\_n)\vec{Ir}(tn) \cdot w-$$

where w(tn) is the measured rotation rate of the target object at time tn, $\vec{r}$(tn) the line of sight vector between the radar and the target object at time tn, and w– is the angular rotation vector of the object.

6. The method of claim 4, wherein the at least one tumbling characteristic comprises the angular rotation vector of the object.

7. The method of claim 3, and further comprising:
    repeating the obtaining radar data, determining a decorrelation time, and dividing the obtained decorrelation angle by the determined decorrelation time for a plurality of radar data sets of the object to determine a rotation rate of the object for each of the plurality of radar data sets; and
    identifying a maximum rotation rate from the determined rotation rates for each of the plurality of radar data sets, wherein the identified maximum rotation rate is the rotation rate of the object.

8. The method of claim 7, wherein the plurality of radar data sets comprise radar data sets obtained on different orbital passes of the object.

9. The method of claim 7, wherein the plurality of radar data sets comprise radar data sets obtained from different radars.

10. The method of claim 1, wherein obtaining the RCS decorrelation angle of the object comprises:
    acquiring a geometry of the object;
    generating a distribution of radio scatterers within the geometry of the object;
    calculating multiple radar cross sections at different angles for the distribution;
    finding an autocorrelation as a function of angle for each of the multiple radar cross sections; and
    obtaining the decorrelation angle based on the autocorrelations.

11. The method of claim 10, and further comprising:
    repeating the generating a distribution of radio scatterers, calculating multiple radar cross sections, and finding an autocorrelation as a function of angle, for each of a plurality of different distributions of scatterers; and
    obtaining the decorrelation angle based on the autocorrelations.

12. The method of claim 10, wherein acquiring the geometry of the target object comprises acquiring at least one physical dimension of the object or a three-dimensional shape of the object.

13. The method of any one of claim 1, wherein the RCS decorrelation angle of the object is obtained by simulation or measurement.

14. The method of claim 13, and further comprising:
    defining a plurality of different time windows in the time series of data to produce a plurality of windowed data; and
    finding an autocorrelation function versus time for each of the plurality of windowed data to generate multiple autocorrelation functions versus time;
    analyzing the multiple autocorrelation functions versus time to identify a time delay at which the autocorrelation has a value that is half of a peak value for the autocorrelation; and
    identifying the time delay as the determined decorrelation time.

15. The method of claim 14, wherein the applying noise suppression comprises applying at least one of: a low-pass filter; a high-pass filter.

16. The method of claim 1, wherein determining the decorrelation time comprises:
    extracting a time series of data from the radar data of the object;
    defining a time window in the time series of data to produce windowed data;

finding an autocorrelation function versus time from the windowed data; and obtaining the decorrelation time based on the autocorrelation function versus time.

17. The method of claim 16, and further comprising:

applying noise suppression to the time series of data to produce filtered time series data; and producing windowed data based on the filtered time series data.

18. The method of claim 16, wherein the defining a time window in the time series of data to produce windowed data comprises:

defining a time period in the time series of data;

multiplying the time series data in the time period with a window; and subtracting the mean to produce the windowed data.

19. The method of claim 1, wherein the at least one tumbling characteristic of the object comprises whether or not the object is rotating.

20. The method of claim 1, wherein the object is a resident space object (RSO).

21. The method of claim 1, and further comprising:

comparing the determined at least one tumbling characteristic of the object to a stored record of a previously determined at least one tumbling characteristic of a previous object; and based on the comparison, determining whether the object and the previous object are the same object.

22. A system arranged to carry out the method of any one of claim 1.

23. A system to determine tumbling characteristic of objects, comprising:

a radar to obtain radar data of each object; and at least one processor arranged to execute code to allow the processor to:

obtain a decorrelation angle of a radar cross section (RCS) of each object;

determine a decorrelation time of the RCS of each object from the radar data of that object;

determine the at least one tumbling characteristic of that object based on the obtained decorrelation angle and the determined decorrelation time for each object;

generate a notification of the at least one tumbling characteristic; and transmit an alert corresponding to the notification to a display of a system operator.

24. The system of claim 23, wherein the processor is further arranged to execute code to allow the processor to:

determine the at least one tumbling characteristic of that object by dividing the obtained decorrelation angle by the determined decorrelation time to determine the at least one tumbling characteristic of the object.

25. The system of claim 23, wherein the at least one tumbling characteristic of each object comprises a rotation rate of that object.

26. The system of any of claim 23, and further comprising a database.

27. The system of claim 26, the processor further arranged to execute code to access the database to obtain a decorrelation angle of an RCS of each object.

28. The system of claim 26, the processor further to execute code to store the rotation rate of the object associated with the object in the database.

* * * * *